United States Patent [19]

Romanski et al.

[11] 3,884,840

[45] May 20, 1975

[54] GRAPHITE-PITCH ELECTRODE PASTE

[75] Inventors: Andrezej Antoni Florian Romanski; Michael John Allen; John Malcolm Fletcher; Ian Burnett Laing; Harry Markham, all of Sheffield, England

[73] Assignee: British Steel Corporation, London, England

[22] Filed: Apr. 10, 1973

[21] Appl. No.: 349,789

[30] Foreign Application Priority Data
Apr. 27, 1972 United Kingdom............... 19666/72
Dec. 9, 1972 United Kingdom............... 58717/72

[52] U.S. Cl. ............... 252/511; 106/284; 106/307; 117/226; 117/228; 156/92; 156/158; 156/304; 156/337; 313/351
[51] Int. Cl. .......................... H01b 1/106; H01j 1/88
[58] Field of Search ............ 252/510, 511; 106/307, 106/284; 156/91, 92, 158, 304, 337; 117/226, 228; 161/53, 54; 313/357

[56] References Cited
UNITED STATES PATENTS

| | | | |
|---|---|---|---|
| 1,495,749 | 5/1924 | Klugh | 313/357 |
| 2,270,199 | 1/1942 | Thrune | 252/510 |
| 2,683,107 | 7/1954 | Juel | 252/510 X |
| 2,884,391 | 4/1959 | Winter et al. | 252/511 UX |
| 3,055,789 | 9/1962 | Gemmi | 156/337 X |
| 3,140,967 | 7/1964 | Kaufmann et al. | 156/91 |
| 3,275,488 | 9/1966 | Bailey et al. | 156/337 X |
| 3,405,308 | 10/1968 | Roche | 313/357 X |
| 3,468,737 | 9/1969 | Hildebrandt et al. | 252/511 X |
| 3,505,040 | 4/1970 | Pinchbeck | 252/510 X |
| 3,702,771 | 11/1972 | Brown et al. | 252/510 X |
| 3,705,947 | 12/1972 | Persson | 313/357 X |
| 3,787,336 | 1/1974 | Sharp | 252/510 X |

*Primary Examiner*—Benjamin R. Padgett
*Assistant Examiner*—R. E. Schafer
*Attorney, Agent, or Firm*—Bacon & Thomas

[57] ABSTRACT

The invention relates to a paste for joining together parts of carbon electrodes, of the type used in electrical steel making. The paste consists of a mixture of pitch and an electrically conducting powder the mixture being sufficiently viscous to be applied as a paste but to set and be non-sticky at normal ambient temperatures.

4 Claims, No Drawings

GRAPHITE-PITCH ELECTRODE PASTE

This invention relates to a paste for joining carbon and graphite articles and particularly for joining carbon electrodes.

An object of the invention is to provide a paste which can be applied to a carbon or graphite article and which will set so that it is not sticky, thus enabling the articles to be handled, but will melt and form an electrically conductive bond when articles coated with the paste are brought together and heated.

According to the invention a paste for use in joining carbon or graphite articles comprises a mixture of pitch and an electrically conducting powder, the mixture being sufficiently viscous to be applied hot as a paste but to set and be substantially non-sticky at normal ambient temperatures. The viscosity of the pitch used in the paste should be selected in accordance with the size of the electrodes to be joined. For very small electrodes of the order of 3 inches in diameter or less, this viscosity should preferably be in the range 10,000 to 150,000 poises, but for larger electrodes up to and including electrodes of 24 inches in diameter, the pitch should have a viscosity in the range 10 to 10,000 poises at 15.5°C.

The viscosity of the pitch is mainly important as far as the application of the hot paste is concerned. During this process the electrode exerts a cooling effect, and the resulting change in paste viscosity is dependant on the size of the electrode. It is advantageous to keep the paste at as low a temperature as possible to avoid irreversible thermal changes, therefore it is more convenient to use different pastes for electrodes of different diameters than to heat the paste to temperatures significantly higher than 80°C.

Equally, the proportion of the electrically conducting powder, which is preferably graphite powder, is advantageously varied according to the size of the electrode. For the smaller electrodes mentioned above, the proportion of graphite powder to pitch is preferably in the range 10 to 40 percent, whereas with the larger electrodes, the percentage should be at the smaller end of this range or below the range used in the smaller electrodes.

The conventional way of joining carbon electrodes is to use a double conical nipple with a thread on it which engages in internal threads formed in bores in the end faces of the two electrodes to be joined. If, as often happens, the joint faces are not accurately machined the joint will not provide continuous electrical contact through the faces and so the resistance of the joint is high. This causes a rise in temperature when electric current is passed through the electrode and can cause joint breakages and the cracking of electrodes.

The present method of trying to overcome the problem is to insert a pitch plug in a cavity in the nipple. When current is passed the pitch melts and this improves the joint between the threaded part of the nipple and the threaded bores of the electrodes. The pitch does not penetrate the end face joint. Currently as many as 10 to 15 percent of electrode joints turn out to be inferior joints as a result of which a low proportion of the current goes through the face joint. Since the major part of the current passes through the nipple the nipple overheats causing stresses. By using a paste made in accordance with this invention the electrodes can be transported with the paste in situ and when the two electrodes are brought together to form a joint the paste is squashed between the end faces. When the electrode enters the furnace it warms up and the heat causes chemical changes in the paste. Particularly the heat causes carbonisation of the paste. This improves the conductivity of the paste and also glues the end faces together increasing the mechanical strength of the joint.

The paste requires the following properties:
1. It must not flow or sag after application to the end face.
2. It must adhere firmly to the electrode surface permitting electrode handling during storage and subsequent transport.
3. It must not come off easily on the hands of the user.

The important quality of the paste apart from its conductivity is its viscosity. The paste needs to be of the viscosity of a pate. It has to be sticky enough to stick to the electrode when hot but not to adhere to the fingers after cooling.

Examples of the use of the invention will now be described. In manufacturing the paste for use with smaller electrodes, i.e. of the order of 3 inches in diameter and less, a suitable pitch is Special Pitch No. 3 manufactured by British Steel Corporation Chemicals Division. Graphite powder is a suitable electrically conducting powder and Avarc 189 Graphite powder manufactured by C. R. Averill Ltd., is a suitable graphite powder.

In forming a paste in accordance with the invention graphite powder of grain size as fine as possible but not larger than 150 microns is mixed with Special Pitch No. 3 in a heated vessel.

In one example of a paste made in accordance with the invention, 70 parts of Special Pitch No. 3 (viscosity 100,000 poises at 15.5°C) were heated to 80°C, at which temperature the pitch viscosity was reduced to a level whereby 30 parts of Avarc 189 graphite powder having a particle size 98 percent below 10 microns could readily be dispersed by stirring to give a homogeneous mixture.

For the larger electrodes, i.e. greater than 3 inches in diameter, and in this particular example electrodes of 24 inches in diameter, the paste is made up by taking 74 parts of Special Pitch No. 4, manufactured by Chemicals Division of British Steel Corporation, the pitch having a viscosity of 270 poises at 15.5°C, and heating the pitch to 60°C. At this temperature the pitch viscosity is reduced to a level such that 26 parts Avarc 189 Graphite powder could readily be dispersed by stirring to give a homogeneous mixture. Graphite powder used has a particle size 98 percent below 10 microns. In using such a pitch to join large arc furnace electrodes of 24 inches diameter, the paste must be applied hot and it is important that it does not solidify too quickly. The lower viscosity pitch referred to above is therefore much more suitable for such large electrodes, but in order to minimise the irreversible hardening which occurs, the pitch for larger electrodes must be kept and applied at the lowest possible temperature. Also the electrode should be painted when its temperature is close to room temperature.

To avoid problems with the paste layer running from the surface of the larger electrodes, the thickness of the paste layer should not exceed 1 mm.

We claim:

1. A carbon electrode paste, the paste comprising a mixture of pitch and graphite, the graphite being of particle size 98% below 10 microns, the mixture being sufficiently viscous to be applied as a paste but to set and be substantially nonsticky at normal ambient temperatures, the viscosity of the pitch lying in the range 10 to 150,000 poises at 15.5°C, and the proportion of graphite powder to pitch lying in the range of 10 to 40 percent by weight.

2. A carbon electrode paste according to claim 1 for joining carbon electrodes of 3 inches diameter or less and in which the viscosity of the pitch lies in the range 10,000 to 150,000 poises at 15.5°C.

3. Carbon electrodes coated with a paste comprising pitch and graphite powder on their faces which are to be brought together when joining two electrodes, the paste being non-sticky at ambient temperatures but melting to form an electrically conductive bond when two electrodes are joined together and heated to a high temperature, the viscosity of the pitch lying in the range 10,000 to 150,000 poises at 15.5°C, the proportion of graphite powder to pitch lying in the range of 10 to 40 percent by weight, and the particle size of the graphite being about 98 percent below 10 microns.

4. A method of joining two parts of a carbon electrode comprising coating the end faces of the two parts, which are subsequently to be brought together, with a paste comprising pitch having a viscosity between 10,000 and 150,000 poises at 15.5°C and graphite powder, the proportion of the graphite powder being 10 to 40 percent by weight of the pitch and the graphite powder having a particle size being about 98 percent below 10 microns, the paste being sufficiently viscous to be applied as a paste but to set on said end faces and be substantially non-sticky at room temperatures and, at a subsequent time, bringing the parts together with their end faces in contact, placing the electrode in a furnace and heating so that the paste melts and carbonises to form an electrically conducting bond between the two parts.

* * * * *

UNITED STATES PATENT AND TRADEMARK OFFICE
CERTIFICATE OF CORRECTION

PATENT NO. : 3,884,840
DATED : May 20, 1975
INVENTOR(S) : Andrezej Antoni Florian Romanski; Michael John Allen; John Malcolm Fletcher; Ian Burnett Laing; Harry Markham It is certified that error appears in the above-identified patent and that said Letters Patent are hereby corrected as shown below:

Col 1, line [73], change Assignee to read ---British Steel Corporation (Chemicals) Limited---

Signed and Sealed this eighteenth Day of November 1975

[SEAL]

Attest:

RUTH C. MASON
Attesting Officer

C. MARSHALL DANN
Commissioner of Patents and Trademarks